(12) United States Patent
Ishitoya

(10) Patent No.: US 8,642,225 B2
(45) Date of Patent: Feb. 4, 2014

(54) HIGH-PRESSURE FLUID SUPPLY APPARATUS

(75) Inventor: Tsukuo Ishitoya, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/145,035

(22) PCT Filed: Jan. 19, 2009

(86) PCT No.: PCT/JP2009/050646
§ 371 (c)(1),
(2), (4) Date: Jul. 18, 2011

(87) PCT Pub. No.: WO2010/082348
PCT Pub. Date: Jul. 22, 2010

(65) Prior Publication Data
US 2011/0269045 A1 Nov. 3, 2011

(51) Int. Cl.
*H01M 8/04* (2006.01)
*F17D 1/04* (2006.01)
*F17D 1/02* (2006.01)

(52) U.S. Cl.
USPC ............ 429/444; 429/443; 137/468; 137/455

(58) Field of Classification Search
USPC ........................ 429/443, 444; 137/455, 468
See application file for complete search history.

(56) References Cited

U.S. PATENT DOCUMENTS

| | | | |
|---|---|---|---|
| 6,186,112 B1 * | 2/2001 | Takahashi et al. | ........ 123/198 D |
| 2009/0053567 A1 * | 2/2009 | Katano | ........................... 429/25 |

FOREIGN PATENT DOCUMENTS

| | | | | |
|---|---|---|---|---|
| EP | 0 961 021 A2 | 12/1999 | | |
| JP | 2002-286190 A | 10/2002 | | |
| JP | 2006-077932 A | 3/2006 | | |
| JP | 2007016630 A * | 1/2007 | ............. | F02D 41/22 |
| JP | 2007-040435 A | 2/2007 | | |
| JP | 2008-008378 A | 1/2008 | | |
| WO | WO 2007020957 A1 * | 2/2007 | ............. | H01M 8/04 |
| WO | 2008/013065 A1 | 1/2008 | | |

OTHER PUBLICATIONS

Machine translation for Idogawa et al., JP 2007-016630 A.*
International Search Report of PCT/JP2009/050646 mailed Feb. 10, 2009 & Written Opinion in Japanese.

* cited by examiner

*Primary Examiner* — Edu E Enin-Okut
(74) *Attorney, Agent, or Firm* — Kenyon & Kenyon LLP

(57) ABSTRACT

A high-pressure fluid supply apparatus that avoids gas leakage due to a reduction in the performance of a seal member provided inside piping is provided. A high-pressure fluid supply apparatus is provided, the apparatus including: piping that supplies a fluid from a high-pressure fluid supply source to a fluid utilizing device via a first valve device and a second valve device; a seal member that is arranged at a pipe part between the first and second valve devices in order to maintain sealing property of the pipe part, the seal member being made of an elastic material; and a control unit that controls closing and opening of the first and second valve devices to be able to adjust a pressure variation rate of the fluid in the pipe part, wherein the control unit adjusts the pressure variation rate in accordance with a temperature of the seal member.

7 Claims, 6 Drawing Sheets

(B) DURING LOW TEMPERATURE

HIGH-PRESSURE FLUID SUPPLY APPARATUS

This is a 371 national phase application of PCT/JP2009/050646 filed 19 Jan. 2009, the contents of which are incorporated herein by reference.

TECHNICAL FIELD

The present invention relates to a high-pressure fluid supply apparatus.

BACKGROUND ART

A fuel cell system is an example of a system that receives a supply of a fluid stored in a high-pressure fluid supply source, such as a high-pressure gas tank, via high-pressure piping and uses the fluid. In the fuel cell system, a fuel gas is supplied from a high-pressure gas tank that is filled with a hydrogen gas or natural gas, which serves as the fuel gas, at high pressure to a fuel cell via high-pressure piping. A plurality of valve devices are provided in the piping, whereby the supply pressure (amount of supply) of the fuel gas can be adjusted in stages.

Hydrogen or the like is used as a fuel gas in such a fuel cell system, and thus the handling of the fuel cell system needs to be considered sufficiently in terms of safety. In particular, gas leakage in the step of supplying the fuel gas needs to be prevented. For example, in patent document 1, it is proposed that a seal member of a high-pressure tank is provided with a temperature adjustor to avoid a reduction in the performance of the seal member.
Patent Document 1: JP2008-008378 A

DISCLOSURE OF THE INVENTION

Problem to be Solved by the Invention

However, the gas leakage in the step of supplying the fuel gas may occur not only inside the high-pressure tank but also inside the piping. For example, a seal member made of an elastic material is used for, e.g., a joint part of the piping, and the seal member is deformed while following a variation of pressure inside the piping, thereby preventing leakage of gas from the joint part. However, the performance of the seal member may be reduced by the influence of temperature. In such a situation, when the pressure inside the piping is rapidly applied/decreased, the following deformation of the seal member takes time, which results in leakage of gas from the joint part of the piping.

The present invention has been made in light of the problem of the conventional techniques above, and an object of the invention is to provide a high-pressure fluid supply apparatus that avoids gas leakage due to a reduction in the performance of a seal member provided inside piping.

Means for Solving the Problem

In order to solve the problem above, the present invention employs the following means: a high-pressure fluid supply apparatus, comprising: piping that supplies a fluid from a high-pressure fluid supply source to a fluid utilizing device via a first valve device and a second valve device; a seal member that is arranged at a pipe part between the first and second valve devices in order to maintain sealing property of the pipe part, the seal member being made of an elastic material; and a control unit that controls closing and opening of the first and second valve devices to be able to adjust a pressure variation rate of the fluid in the pipe part, wherein the control unit adjusts the pressure variation rate in accordance with a temperature of the seal member.

With such a configuration, the pressure variation rate of the pipe part can be adjusted in accordance with the deformation performance of the seal member, which varies depending on temperature. Accordingly, leakage of gas from the pipe part due to a deformation delay of the seal member can be avoided.

In this specification, the "temperature of a seal member" encompasses not only a temperature from a direct measurement of the seal member but also an estimated temperature of the seal member, which is estimated from the measured value, etc., of, e.g., the temperature in the vicinity of the seal member, temperature of a fluid that flows through a pipe part, temperature of a fluid utilizing device, and outside-air temperature outside a fluid supply apparatus.

Further, in this specification, the "elastic material" refers to a material having elasticity larger than that of metal, etc., and typically refers to rubber, silicon, etc. In addition, the "high pressure" refers to a pressure of, e.g., 1 MPa or more from a quantitative point of view Further, in the configuration above, when the temperature of the seal member is lower than a predetermined temperature, the control unit may cause the pressure variation rate to be lower than that in a case where the temperature is higher than the predetermined temperature.

According to such a configuration, the pressure variation rate is lower in a lower-temperature environment where the deformation performance of the seal member is reduced, whereby gas leakage at the pipe part can be prevented more reliably; meanwhile, in an environment where the deformation performance is not reduced, the pressure variation rate does not need to be lowered, and thus this can facilitate the shortening of the time that it takes to reach a desired pressure.

Further, in the configuration above, the control unit may adjust the pressure variation rate when the pressure of the fluid in the pipe part is increased.

When the pressure of the fluid in the pipe part is increased, gas leakage due to a deformation delay of the seal member occurs, and thus the configuration above is especially useful.

Further, in the configuration above, the control unit may adjust the pressure variation rate when the pressure of the fluid in the pipe part is decreased.

When the deformation of the seal member is delayed while the pressure of the pipe part is being reduced, this may lead to the defect of the seal member not returning to the proper position after the pressure reduction. However, the configuration above avoids the deformation delay of the seal member during pressure reduction, whereby such a defect can be prevented.

Further, in the configuration above, the pipe part may be constituted by a first pipe part that is connected to the first valve device, a second pipe part that is connected to the second valve device and a joint part that connects the first pipe part and the second pipe part. The seal member may be an O ring or gasket provided in each of a first groove between the joint part and the first pipe part and a second groove between the joint part and the second pipe part.

With the configuration above, a deformation delay of the O ring or gasket provided in each of the first groove between the first pipe part and the joint part and the second groove between the second pipe part and the joint part can be prevented, and thus gas leakage at the joint part between the pipes with the high possibility of gas leakage can be avoided.

Further, the fluid may be a fuel gas, and the fluid utilizing device may be a fuel cell.

With the configuration above, gas leakage due to the reduction in the performance of a seal member in piping of a fuel cell system can be prevented.

Effect of the Invention

The present invention can provide a high-pressure fluid supply apparatus that avoids gas leakage due to a reduction in the performance of a seal member provided inside piping.

DESCRIPTION OF REFERENCE SYMBOLS

Figure 1:
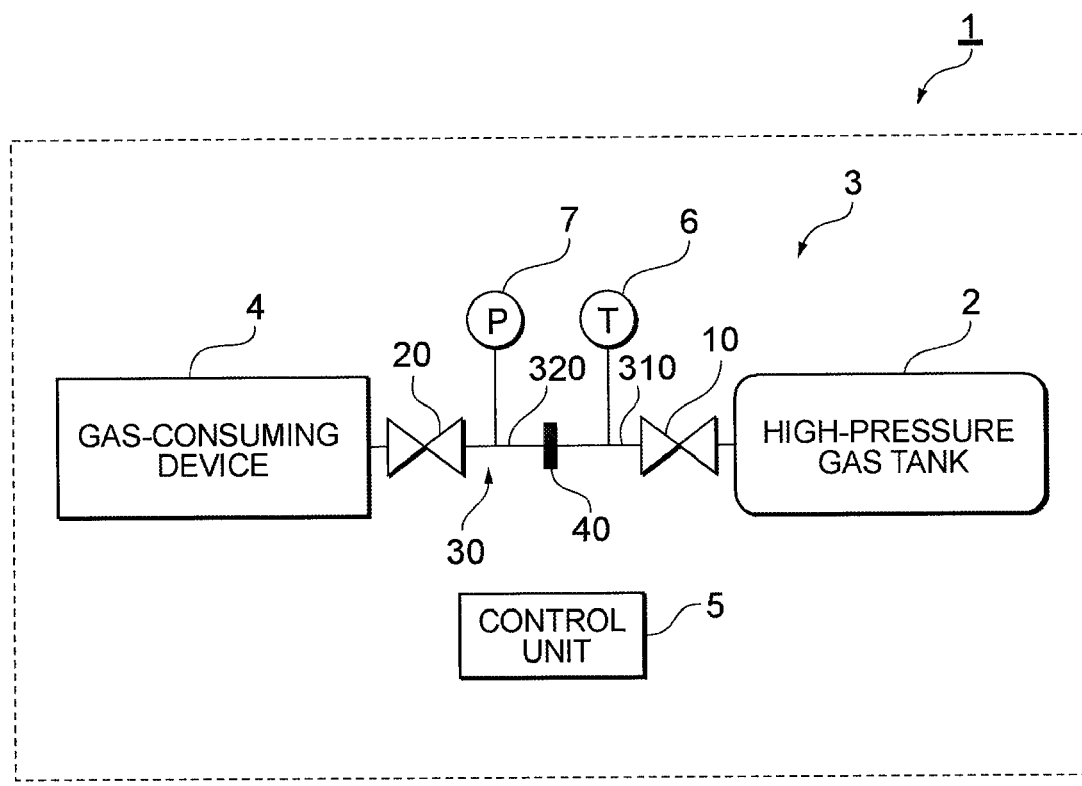
FIG. 1 is a schematic diagram of a high-pressure fluid supply apparatus according to an embodiment of the invention.

1: fluid supply apparatus, 2: high-pressure gas tank (high-pressure fluid supply source), 3: piping, 4: gas-consuming device (fluid utilizing device), 5: control unit, 6: temperature sensor, 7: pressure sensor, 10: first gas supply valve (first valve device), 20: second gas supply valve (second valve device), 30: pipe part, 310: first pipe part, 320: second pipe part, 40: joint part, 41: body, 410: hollow portion, 412: groove, 42, 43, 44, 45: fixation jig, 50: seal member, 100: vehicle

BEST MODE FOR CARRYING OUT THE INVENTION

A fluid supply apparatus according to an embodiment of the present invention will hereinafter be described with reference to the attached drawings. In the drawings, the same parts are denoted by the same symbols.

(Configuration of High-Pressure Fluid Supply Apparatus)

First, the outline of the high-pressure fluid supply apparatus according to an embodiment of the invention will be described with reference to FIG. 1. Here, FIG. 1 is a schematic diagram of a high-pressure fluid supply apparatus 1 according to the embodiment of the invention.

As shown in FIG. 1, the high-pressure fluid supply apparatus 1 includes a high-pressure gas tank 2 (high-pressure fluid supply source), piping 3, gas-consuming device 4 (fluid utilizing device) and a control unit 5.

The high-pressure gas tank 2 is a container that stores natural gas, hydrogen gas, or the like, serving as fuel gas, which is compressed at high pressure, and the internal pressure is, for example, 70 MPa when the maximum amount of the fuel gas is filled into the high-pressure gas tank 2. The fuel gas stored in the high-pressure gas tank 2 can be supplied to the gas-consuming device 4 via the piping 3.

The piping 3 includes a first gas supply valve 10 (first valve device) on the high-pressure gas tank 2 side (hereinafter referred to as the "upstream side") and a second gas supply valve 20 (second valve device) on the gas-consuming device 4 side (hereinafter referred to as the "downstream side"), and includes a pipe part 30 between these supply valves. As the first gas supply valve 10 and second gas supply valve 20, mechanical pressure reducing valves, electromagnetic drive type pressure regulating valves (injectors), etc., can be employed.

The pipe part 30 includes two physically separate pipes, a first pipe part 310, which is arranged on the upstream side and is connected to the first gas supply valve 10, and a second pipe part 320, which is arranged on the downstream side and is connected to the second gas supply valve 20. The first pipe part 310 and the second pipe part 320 are connected to each other through a joint part 40. Seal members (not shown) made of an elastic material are arranged respectively between the joint part 40 and the pipe part 310 and between the joint part 40 and the pipe part 320, and these seal members maintain the sealing property of the pipe part 30. A seal structure of the pipe part 30 will be described in detail below. Note that the pipe part 30 includes a temperature sensor 6 and a pressure sensor 7, and the values of the temperature and internal pressure of the pipe part 30 which are respectively measured by these sensors are input to the control unit 5.

The gas-consuming device 4 is a device that consumes the fuel gas supplied from the high-pressure gas tank 2 via the piping 3, and is, for example, a fuel cell (FC) in this embodiment. The fuel cell has a stack structure in which a required number of single cells, each generating electric power by being supplied with a fuel gas and an oxidant gas (reaction gases), are stacked.

The control unit 5 controls various operations of the high-pressure fluid supply apparatus 1. The control unit 5, for example, controls the closing and opening of the first and second gas supply valves 10 and 20 in order to control the amount of supply of the fuel gas from the high-pressure gas tank 2 to the gas-consuming device 4 based on the amount of power generation required by the gas-consuming device 4. Also, the control unit 5, for example, detects any gas leakage of the high-pressure gas tank 2 and piping 3, e.g., when the power generation of the gas-consuming device 4 is started or after the end of the power generation. The control unit 5 is constituted by a computer system (not shown). Such a computer system includes a CPU, ROM, RAM, HDD, I/O interface, display, etc. The CPU reads various control programs recorded in the ROM to execute the programs, thereby realizing various control operations.

Figure 2:
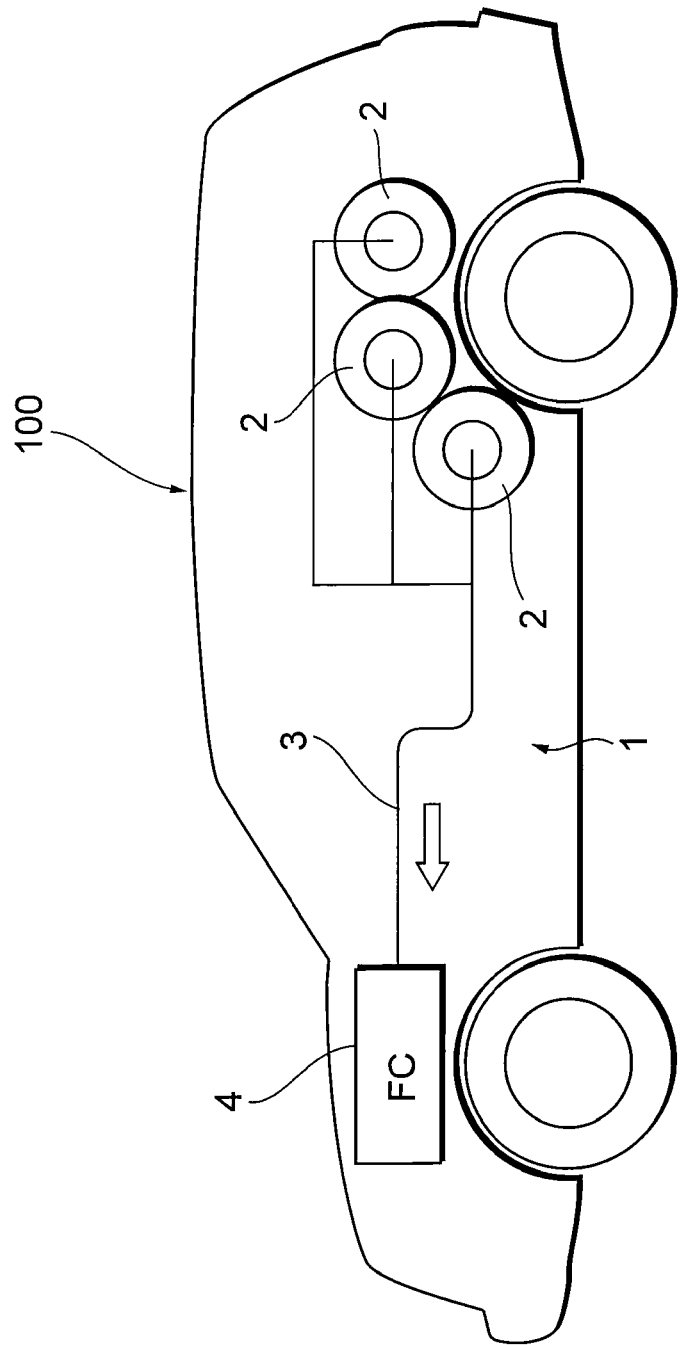
FIG. 2 is a schematic diagram of a high-pressure fluid supply apparatus installed in a vehicle according to the embodiment of the invention.

Note that the high-pressure fluid supply apparatus 1 according to the embodiment of the invention can be applied to various systems that use high-pressure gas, and can be configured as, e.g., a fuel cell system that is installed in a vehicle 100 shown in FIG. 2.

(Seal Structure of Pipe Part)

Figure 3:
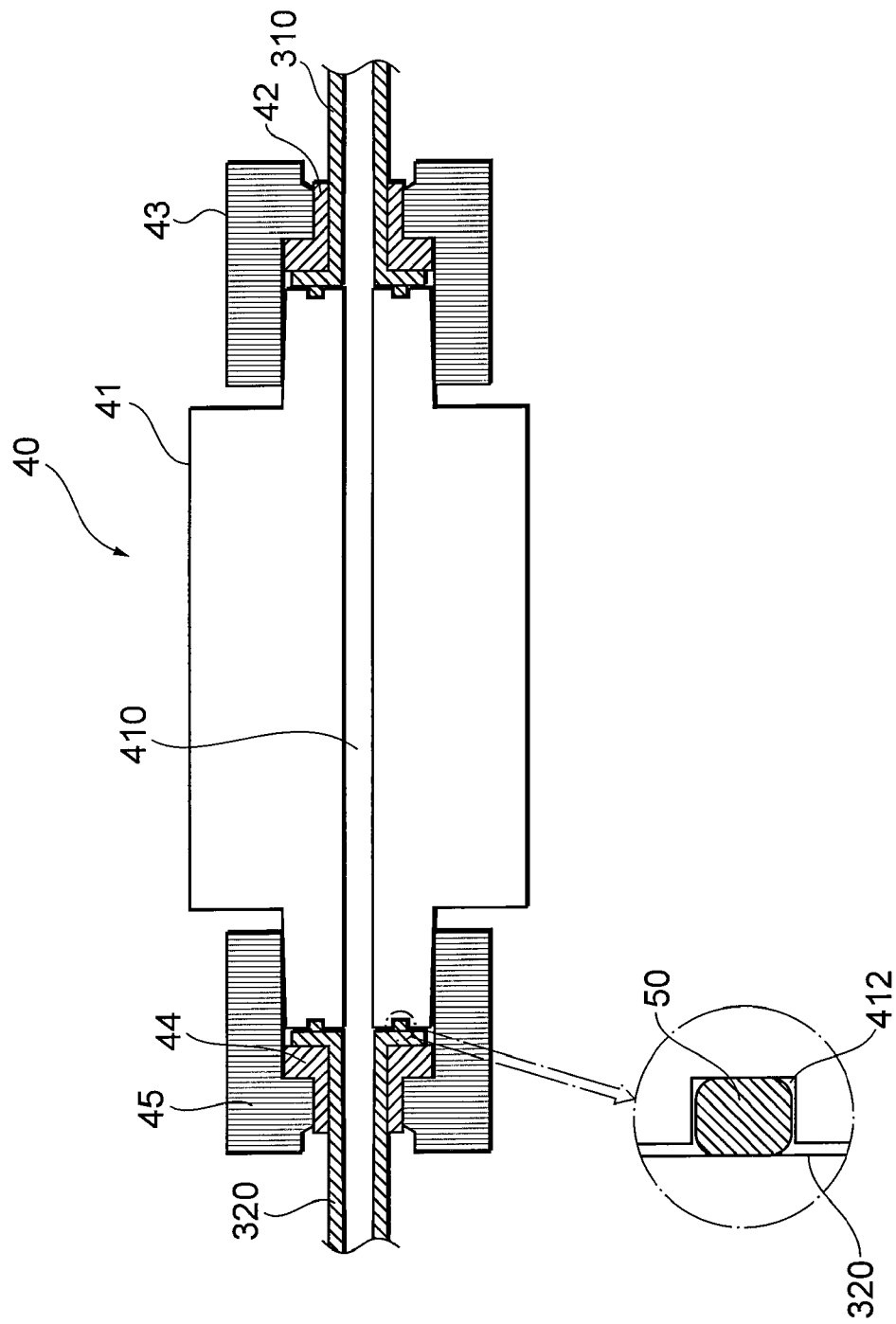
FIG. 3 is a cross-sectional view schematically showing a seal structure between pipe parts and a joint part according to the embodiment of the invention.

Next, the seal structure of the pipe part 30 will be described using FIG. 3. FIG. 3 is a cross-sectional view schematically showing the seal structure between the first and second pipe parts and the joint part according to the embodiment of the invention.

As shown in FIG. 3, a body 41 of the joint part 40 has, in the inside thereof, a hollow portion 410 with the same diameter as the diameters of the first and second pipe parts 310 and 320. The fuel gas that flows from the first pipe part 310 is led via the hollow portion 410 to the second pipe part 320. Here, the connection parts between the first and second pipe parts 310 and 320 and the joint part 40 (hereinafter also referred to simply as the "connection parts") each are sealed by an O ring 50, thereby preventing gas leakage.

The first and second pipe parts 310 and 320 and the joint part 40 form an axisymmetric structure with the longitudinal direction serving as an axis. More specifically, the first pipe part 310 is fixed to an upstream part of the body 41 of the joint part 40 with the use of fixation jigs 42 and 43. Here, a downstream end of the first pipe part 310 is flanged, and abuts against an upstream end of the body 41. An upstream abutment portion of the body 41 is provided with a groove 412. The O ring 50 made of an elastic material is inserted into the groove 412 while being provided with a predetermined compressibility (e.g., 30%).

The connection structure between the joint part 40 and the second pipe part 320 is the same as above. That is, the second pipe part 320 is fixed to a downstream part of the body 41 of the joint part 40 with the use of fixation jigs 44 and 45. Here, an upstream end of the second pipe part 320 is flanged, and abuts against a downstream end of the body 41. A downstream abutment portion of the body 41 is provided with the groove 412. The O ring 50 made of an elastic material is inserted into the groove 412 while being provided with a predetermined compressibility (e.g., 30%).

Examples of materials for the O ring 50 include nitrile rubber (NBR), butyl rubber (IIR), ethylene propylene rubber (EPDM), fluororesin (PEFE) and silicon, and can be selected from the materials having high shape-recovery force during a low temperature. Note that there is no limitation on materials for the first and second pipe parts 310 and 320, joint part 40, fixation jigs 42 to 45, etc., as long as the materials have strength (rigidity) sufficient to allow a high-pressure fluid (e.g., 70 MPa) to flow, and for example, metallic materials are used.

(Fuel-Gas Pressure-Variation-Rate Control at Pipe Part)

In this embodiment, when it is determined that the O ring is in a low-temperature environment, and the deformation performance of the O ring 50 relative to pressure variation (hereinafter also referred to as the "deformation performance") is reduced, pressure variation of the fuel gas that circulates through the pipe part 30 is kept small compared to pressure variation in an ordinary-temperature environment. This will be described below in detail with reference to FIGS. 4 to 6.

Figure 4:
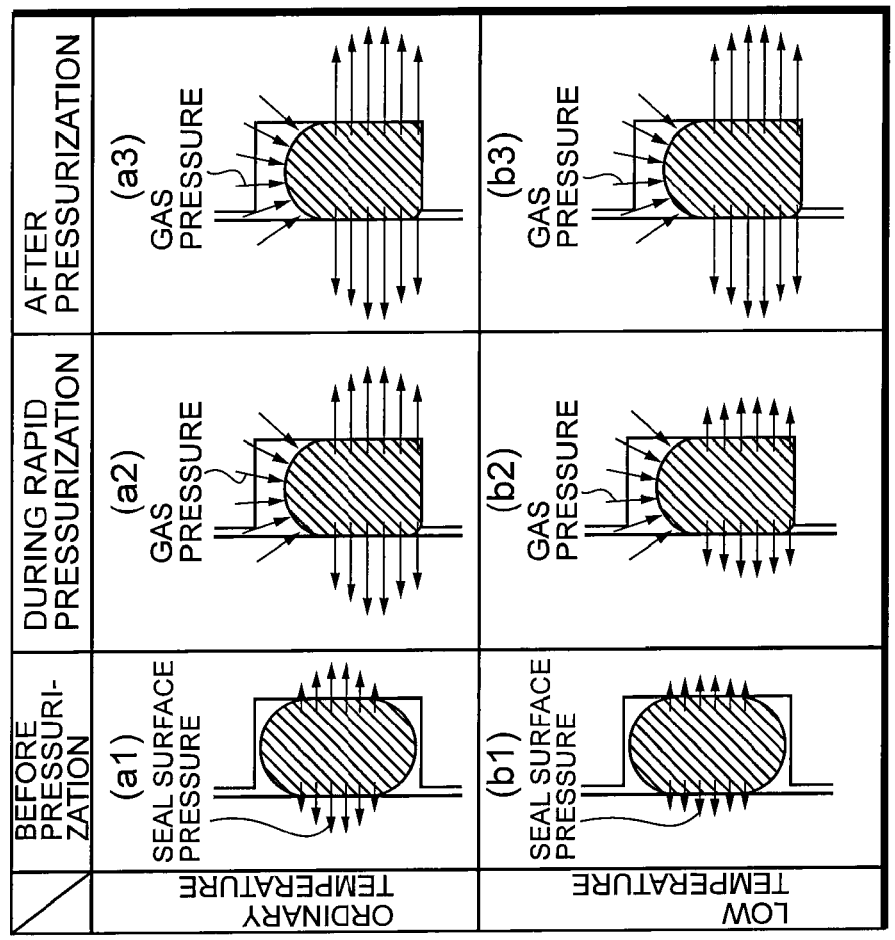
FIG. 4 is a schematic diagram for explaining gas leakage during a low temperature according to the prior art.
Figure 4:
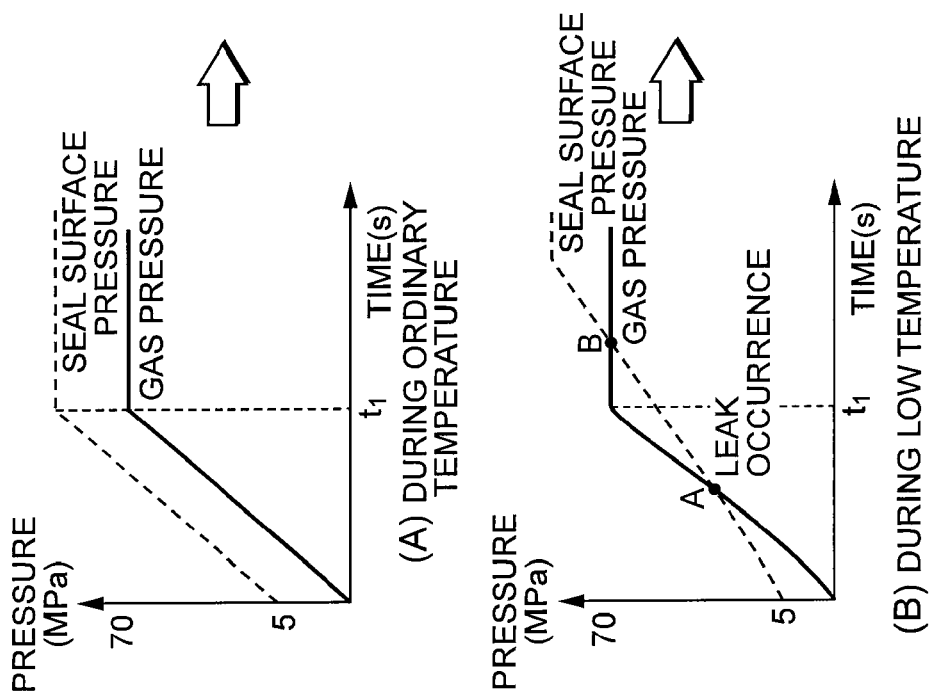

First, the reason why such control is required will be described with reference to FIG. 4. FIG. 4 is a schematic diagram for explaining gas leakage during a low temperature according to the prior art, where the diagrams on the left, for the cases of (A) ordinary temperature and (B) low temperature, each show respective time variations of the pressure (gas pressure) of the fuel gas and the surface pressure (seal surface pressure) of the O ring 50, and the diagrams on the right schematically show the O ring's states before pressurization, during rapid pressurization and after pressurization for the above cases of ordinary temperature and low temperature.

During an ordinary temperature, before pressurization, a seal surface pressure of, e.g., about 5 MPa is applied to the connection part due to the compression of the O ring 50 during the insertion, whereby the connection part is sealed (a1). In this state, when the pipe part 30 is pressurized rapidly, more specifically, when, with a main stop valve of the high-pressure gas tank 2 being open, the control unit 5 opens the first gas supply valve 10 and closes the second gas supply valve 20, the increased pressure causes the O ring 50 to be pressed against one side of the groove 412, so that the O ring 50 is deformed from an O-shape to a D-shape, whereby the seal surface pressure increases as with the gas pressure (a2). Thus, the state where the seal surface pressure is higher than the gas pressure is maintained. This state is maintained until a target pressure (here, 70 MPa) is reached at time $t_1$ (here, 0.1 ms), and the control unit 5 closes the first gas supply valve 10 (a3). That is, even with rapid pressurization, during an ordinary temperature, the deformation delay of the O ring 50 does not occur, and thus the state where the seal surface pressure is higher than the gas pressure is always maintained. Accordingly, a leakage (leak) of gas from the connection part does not occur.

Meanwhile, a gas leakage occurs during a low temperature. This is because (1) during a low temperature, the seal surface pressure is low (e.g., about 3 MPa) in the stage of pre-pressurization (b1) in the first place due to the curing of the O ring 50 and (2) a deformation delay occurs due to the reduction of the deformation performance of the O ring during rapid pressurization (b2), which produces an area where the gas pressure is higher than the seal surface pressure (area A-B of (B) in the diagram on the left) before the gas pressure reaches the above target pressure (e.g., 70 MPa).

Thus, the high-pressure fluid supply apparatus 1 according to this embodiment judges whether or not there is a problem in the deformation performance of the O ring 50, more specifically whether the O ring 50 is in an ordinary-temperature environment or low-temperature environment, and varies the pressure variation rate of the fuel gas that circulates through the pipe part 30 in accordance with the result of such judgment.

More specifically, when a rapid rise in the pressure of the pipe part 30 is anticipated, the control unit 5 estimates the temperature of the O ring 50 from the measured value of the fuel gas temperature by the temperature sensor 6. The control unit 5 then varies the speed of the pressure rise of the pipe part 30 between the case of ordinary temperature, where the estimated temperature value of the O ring 50 is higher than a predetermined temperature, and the case of low temperature, where the estimated temperature value is lower than the predetermined temperature. Here, the predetermined temperature is set arbitrarily depending on the temperature characteristic of the deformation performance of the O ring 50 (e.g., temperature characteristic obtained from a low-temperature elastic restoration test, etc.), target increased-pressure value, etc., and is set to, e.g., −10° C.

Figure 5:
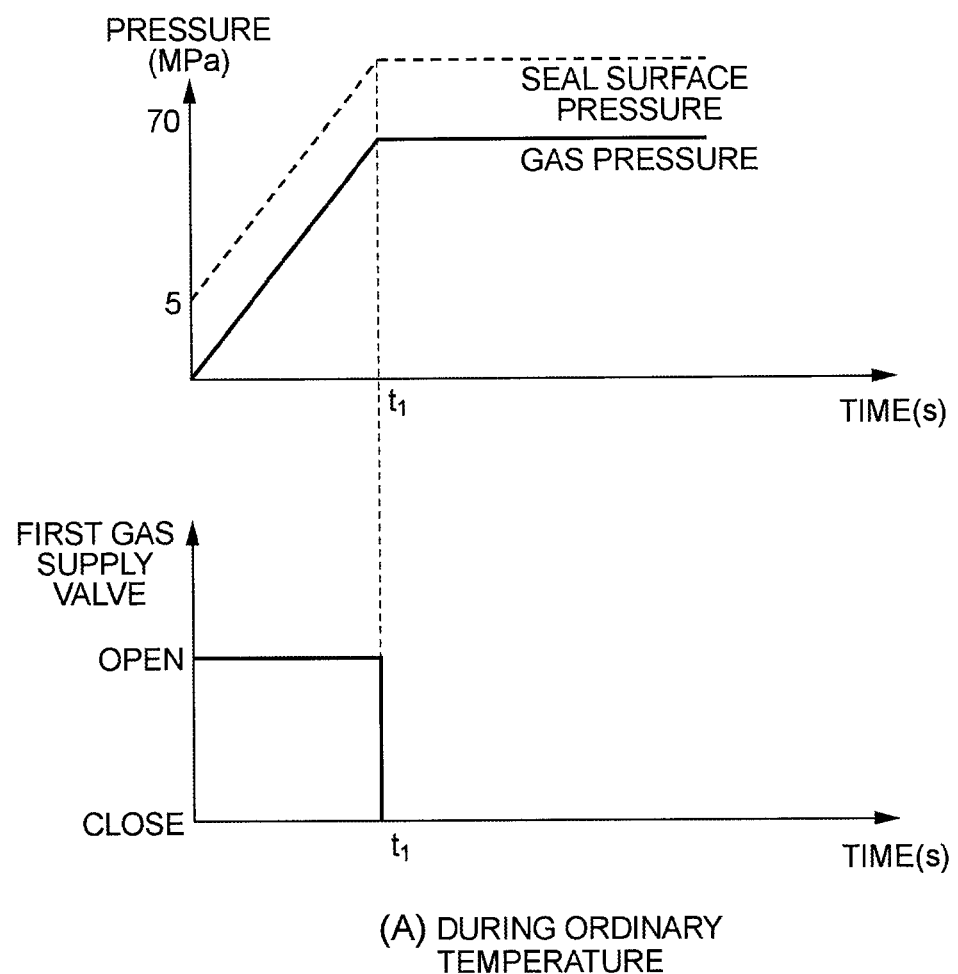
FIG. 5 is a diagram illustrating pressure variation rate control during an ordinary temperature according to the embodiment of the invention.

When the estimated temperature value of the O ring 50 is higher than the predetermined temperature, the control unit 5 keeps the first gas supply value 10 open until time $t_1$ (here, 0.1 ms), which it takes the gas pressure to reach the target pressure (here, 70 MPa) as shown in FIG. 5, (while the second gas supply valve 20 is kept closed). Here, the deformation performance of the O ring 50 has not been reduced, and thus the state where the gas pressure is higher than the seal surface pressure can always be maintained. As a result, while gas leakage of the pipe part 30 can be prevented, the gas pressure can be increased to the target pressure promptly.

Figure 6:
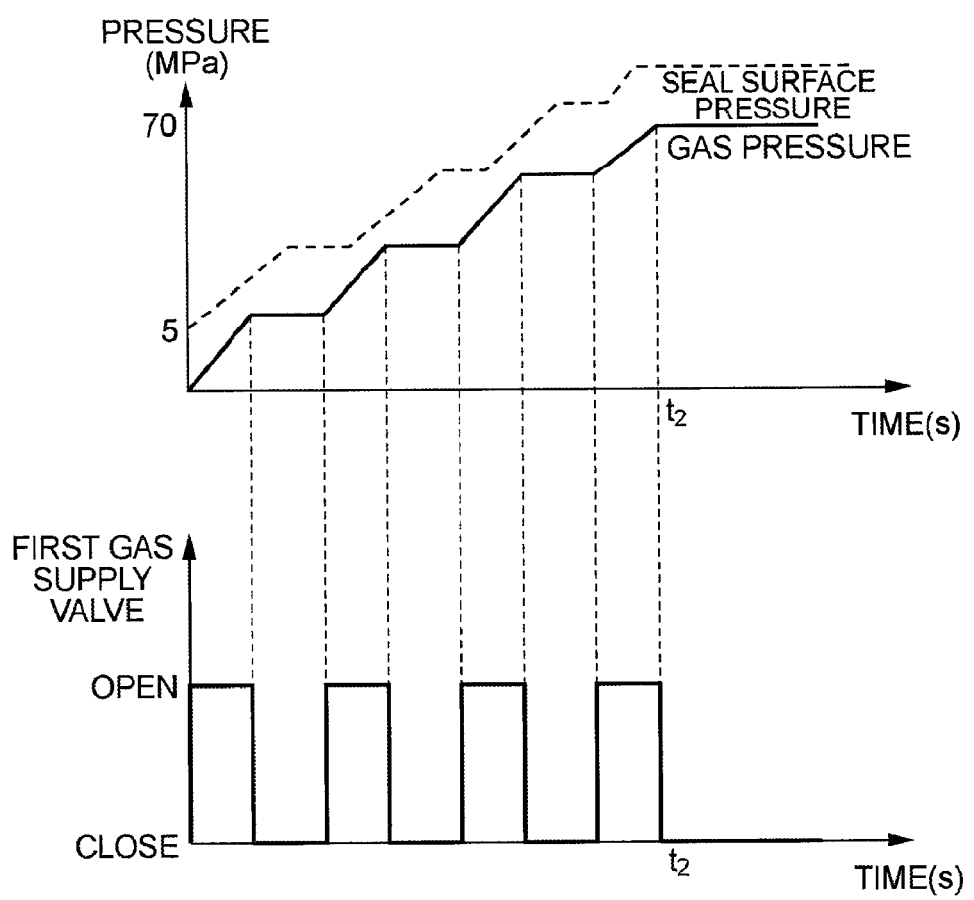
FIG. 6 is a diagram illustrating pressure variation rate control during a low temperature according to the embodiment of the invention.

Meanwhile, when the estimated temperature value of the O ring 50 is lower than the predetermined temperature, the control unit 5 controls the closing and opening of the first gas supply valve 10 such that time $t_2$, which it takes the gas pressure to reach the target pressure (here, 70 MPa), is longer (e.g., 0.3 ms) than time $t_1$ in FIG. 5. Specifically, as shown in FIG. 6, the valve opening time of the first gas supply valve 10 is shortened, and also, intervals are provided to repeat the closing and opening of the first gas supply valve 10 (while the second gas supply valve 20 is kept closed). Thus, even with a deformation delay due to the reduction of the deformation performance of the O ring 50, the gas pressure and the seal surface pressure gradually increase in stages, and the state where the seal surface pressure is higher than the gas pressure is always maintained. Accordingly, gas leakage of the pipe part 30 can be prevented.

(Modifications)

Although the embodiment of the present invention has been described above, the invention is not limited to this embodiment, and may be implemented in various aspects without departing from the gist of the invention.

Although the temperature sensor 6 arranged at the pipe part 30 is used in order to estimate the temperature of the O ring 50 in the embodiment above, the invention is not limited to this. The temperature of the O ring 50 may be measured directly, or may be estimated from, e.g., the temperature of the joint part 40, temperature of the gas-consuming device 4 and outside-air temperature for the high-pressure fluid supply apparatus 1.

Further, although the pressure variation rate during pressurization is varied in two stages, during an ordinary temperature and during a low temperature in the embodiment above, the invention is not limited to this. The closing and opening of the first gas supply valve 10 may be controlled such that, as the temperature is lower, the pressure variation rate during pressurization is lower. For example, the control may be carried out such that: when the temperature is not less than −20° C., the pressure variation rate is 70 MPa/s; when the temperature is lower than −20° C. and not less than −40° C., the pressure variation rate is 50 MPa/s; and when the temperature is less than −40° C., the pressure variation rate is 5 MPa/s. Accordingly, both the shortening of the time it takes to reach a desired pressure and the prevention of gas leakage due to the lowering of temperature can be balanced.

Further, the pressure variation rate during pressurization may be varied in consideration of the time deterioration of the low-temperature performance of the O ring 50. For example, assuming that, when the life cycle of the O ring 50, gas-consuming device 4, etc., is 5 years, 50 MPa/s is employed at −30° C., when the life cycle is 15 years, 5 MPa/s is employed at −30° C.

Further, considering that, when the pressure variation is large, the influence of the deformation delay of the O ring 50 is large, the pressure variation rate during pressurization may be varied in accordance with the amount of pressure increase. That is, when the amount of pressure increase is large (e.g., the pressure is increased from 0 MPa to 70 MPa), the pressure variation rate may be made low, and when the amount of pressure increase is small (e.g., the pressure is increased from 0 MPa to 10 MPa), the pressure variation rate may be made high.

Further, although the pressure variation rate control during pressurization has been described in the embodiment above, the invention is not limited to this. Pressure variation rate control based on the temperature of the O ring 50, which is similar to the above control, may be carried out during pressure reduction. When a deformation delay occurs in the O ring 50 during pressure reduction in a low-temperature environment, this may lead to a defect that the O ring would not return to the proper position (i.e., the center of the groove 412) after the pressure reduction. However, such a defect can be prevented by carrying out the pressure variation rate control based on the temperature of the O ring 50 also during pressure reduction.

Further, the structure of the high-pressure fluid supply apparatus 1 is not limited to the structure described above. For example, the seal member is not limited to the O ring, and a gasket made of rubber or synthetic resin may also be employed. Alternatively, a configuration may be employed in which an O ring is used and, at the same time, the O ring is provided with a back-up ring. Further, the configuration in which the first pipe part 310 and the second pipe part 320 are connected through the joint part 40 is employed; however, for example, a configuration may also be employed in which: grooves are formed in the ends of the first pipe part 310 and second pipe part 320; and seal members are inserted in the grooves, thereby making direct seal connection between the pipe parts.

What is claimed is:

1. A high-pressure fluid supply apparatus, comprising:
   piping that supplies a fluid from a high-pressure fluid supply source to a fluid utilizing device via a first valve device and a second valve device;
   a seal member that is arranged at a pipe part between the first and second valve devices in order to maintain sealing property of the pipe part, the seal member being made of an elastic material; and
   a control unit programmed to control closing and opening of the first and second valve devices by alternating the closing and the opening of the first and second valve devices to adjust a pressure variation rate of the fluid in the pipe part in accordance with a temperature of the seal member until a desired pressure of the fluid in the pipe part is achieved.

2. The high-pressure fluid supply apparatus according to claim 1, wherein when the temperature of the seal member is lower than a predetermined temperature, the control unit is programmed to cause the pressure variation rate to be lower than that in a case where the temperature is higher than the predetermined temperature.

3. The high-pressure fluid supply apparatus according to claim 1, wherein the control unit is programmed to adjust the pressure variation rate when a pressure of the fluid in the pipe part is increased.

4. The high-pressure fluid supply apparatus according to claim 1, wherein the control unit is programmed to adjust the pressure variation rate when a pressure of the fluid in the pipe part is decreased.

5. The high-pressure fluid supply apparatus according to claim 1, wherein:
   the pipe part is constituted by a first pipe part that is connected to the first valve device, a second pipe part that is connected to the second valve device and a joint part that connects the first pipe part and the second pipe part; and
   the seal member is an O ring or gasket provided in each of a first groove between the joint part and the first pipe part and a second groove between the joint part and the second pipe part.

6. The high-pressure fluid supply apparatus according to claim 1, wherein the fluid is a fuel gas, and the fluid utilizing device is a fuel cell.

7. A high-pressure fluid supply apparatus, comprising:
   piping that supplies a fluid from a high-pressure fluid supply source to a fluid utilizing device via a first valve device and a second valve device;
   a seal member that is arranged at a pipe part between the first and second valve devices in order to maintain sealing property of the pipe part, the seal member being made of an elastic material; and
   a control unit programmed to control closing and opening of the first and second valve devices by alternating the closing and the opening of the first and second valve devices to adjust a pressure variation rate of the fluid in the pipe part in accordance with a temperature of the seal member until a desired pressure of the fluid in the pipe part is achieved,
   wherein when the temperature of the seal member is lower than a predetermined temperature, the control unit is programmed to cause the pressure variation rate to be lower than that in a case where the temperature is higher than the predetermined temperature, wherein the pipe part is constituted by a first pipe part that is connected to the first valve device, a second pipe part that is connected to the second valve device and a joint part that connects the first pipe part and the second pipe part, and wherein the seal member is an O ring or gasket provided in each of a first groove between the joint part and the first pipe part and a second groove between the joint part and the second pipe part.

\* \* \* \* \*